United States Patent
Xu

(10) Patent No.: US 9,453,409 B2
(45) Date of Patent: Sep. 27, 2016

(54) SYSTEM AND METHOD FOR SPREAD SPECTRUM BASED DRILL PIPE COMMUNICATIONS

(71) Applicant: HUNT ADVANCED DRILLING TECHNOLOGIES, L.L.C., Dallas, TX (US)

(72) Inventor: Liyu Xu, Austin, TX (US)

(73) Assignee: Hunt Energy Enterprises, L.L.C., Dallas, TX (US)

( * ) Notice: Subject to any disclaimer, the term of this patent is extended or adjusted under 35 U.S.C. 154(b) by 0 days.

(21) Appl. No.: 14/300,671

(22) Filed: Jun. 10, 2014

(65) Prior Publication Data

US 2015/0159482 A1 Jun. 11, 2015

Related U.S. Application Data

(60) Provisional application No. 61/913,648, filed on Dec. 9, 2013.

(51) Int. Cl.

| | |
|---|---|
| *E21B 47/00* | (2012.01) |
| *E21B 47/12* | (2012.01) |
| *E21B 47/14* | (2006.01) |
| *E21B 47/16* | (2006.01) |
| *H04B 1/69* | (2011.01) |

(52) U.S. Cl.
CPC .............. *E21B 47/16* (2013.01); *E21B 47/00* (2013.01); *E21B 47/12* (2013.01); *E21B 47/14* (2013.01); *H04B 1/69* (2013.01)

(58) Field of Classification Search
CPC ........ E21B 47/00; E21B 47/12; E21B 47/14; E21B 47/16; H04B 1/69; H04B 2001/6916
USPC ......... 340/853.2, 854.3, 854.4, 855.4, 855.7, 340/856.4; 367/81, 82; 375/130, 136, 147, 375/150, 240.21, 316, 346
See application file for complete search history.

(56) References Cited

U.S. PATENT DOCUMENTS

| | | | |
|---|---|---|---|
| 5,418,817 A * | 5/1995 | Richter | 375/232 |
| 6,320,820 B1 | 11/2001 | Gardner et al. | |
| 7,558,357 B1 * | 7/2009 | Greshishchev et al. | 375/371 |
| 7,590,029 B2 * | 9/2009 | Tingley | 367/82 |
| 8,102,907 B2 * | 1/2012 | Kim | 375/232 |
| 8,644,265 B2 * | 2/2014 | Wang | H04L 1/0026 370/335 |
| 2003/0072217 A1 | 4/2003 | Macpherson | |
| 2005/0024232 A1 | 2/2005 | Gardner et al. | |
| 2006/0044939 A1 | 3/2006 | Shah et al. | |
| 2006/0114746 A1 * | 6/2006 | Gardner | E21B 47/16 367/82 |
| 2009/0146836 A1 * | 6/2009 | Santoso et al. | 340/854.4 |
| 2012/0201155 A1 * | 8/2012 | Du et al. | 370/252 |
| 2013/0088991 A1 * | 4/2013 | Brisebois et al. | 370/252 |

OTHER PUBLICATIONS

PCT: International Search Report and Written Opinion of PCT/US2014/043904 (related application); Oct. 24, 2014; 10 pgs.

* cited by examiner

*Primary Examiner* — Hai Phan
*Assistant Examiner* — Franklin Balseca
(74) *Attorney, Agent, or Firm* — Howison & Arnott, LLP

(57) ABSTRACT

A system and method are provided for communicating in a borehole. In one example, the method includes receiving a baseband signal transmitted through a drill string using a plurality of elastic waves, where a spectrum of the baseband signal is duplicated after transmission due to oversampling. At least one passband is selected in order to recover the baseband signal from the duplicated spectrum. The baseband signal is decoded to recover a bit stream contained within the baseband signal.

15 Claims, 13 Drawing Sheets

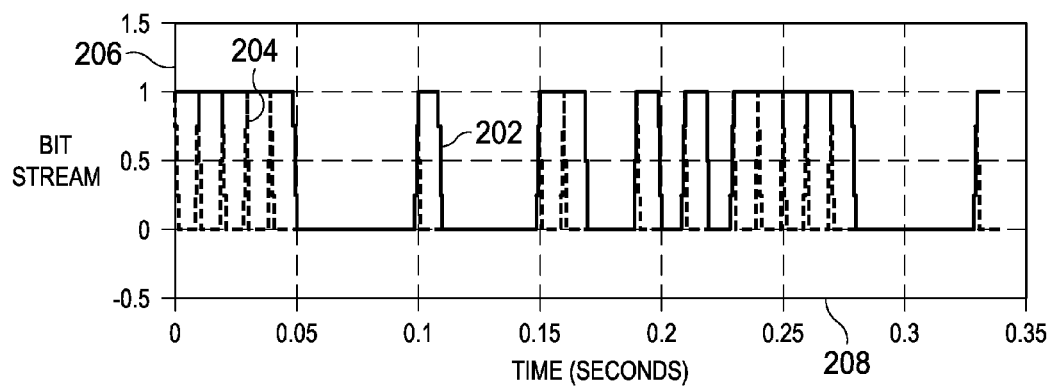
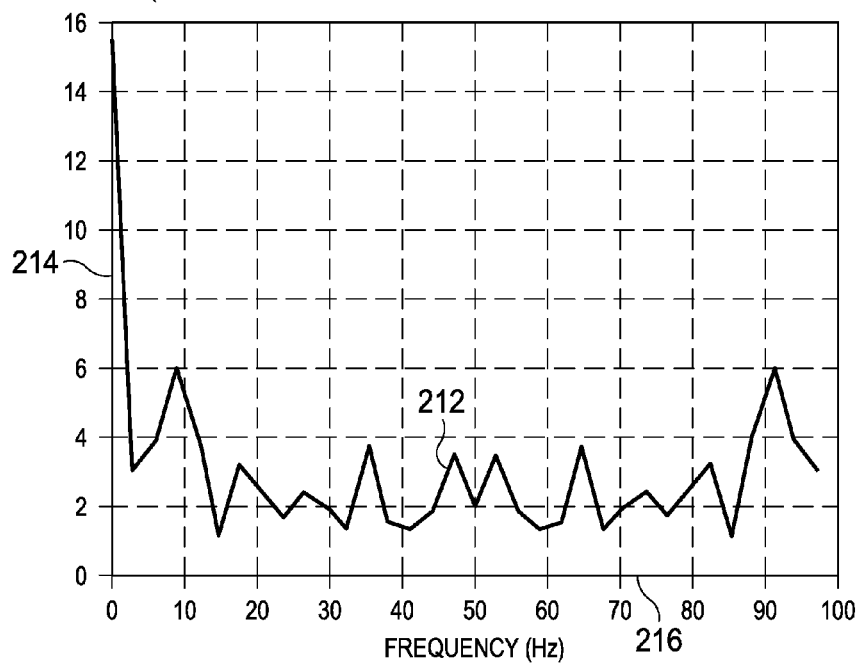

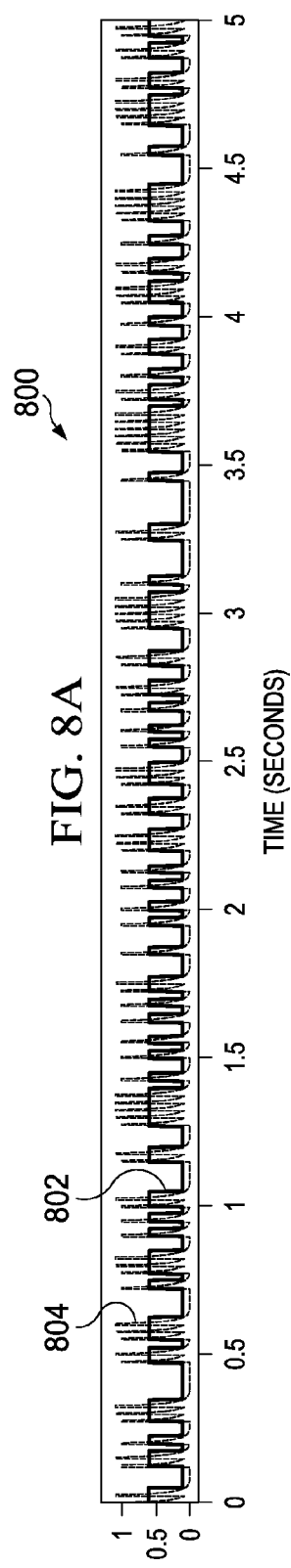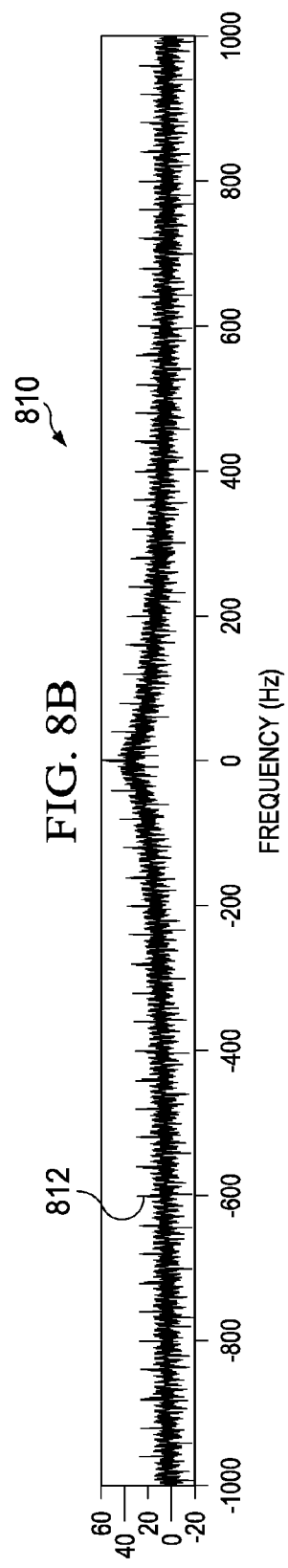

SYSTEM AND METHOD FOR SPREAD SPECTRUM BASED DRILL PIPE COMMUNICATIONS

CROSS-REFERENCE TO RELATED APPLICATIONS

This application claims the benefit of U.S. Provisional No. 61/913,648, filed Dec. 9, 2013, and entitled SYSTEM AND METHOD FOR SPREAD SPECTRUM BASED DRILL PIPE COMMUNICATIONS, which is hereby incorporated by reference in its entirety.

This application is related to U.S. patent application Ser. No. 14/145,044, filed Dec. 31, 2013, entitled SYSTEM AND METHOD FOR USING CONTROLLED VIBRATIONS FOR BOREHOLE COMMUNICATIONS, which is a continuation of U.S. patent application Ser. No. 14/010,259, filed Aug. 26, 2013, entitled SYSTEM AND METHOD FOR DRILLING HAMMER COMMUNICATION, FORMATION EVALUATION AND DRILLING OPTIMIZATION, which is a continuation of U.S. patent application Ser. No. 13/752,112, filed Jan. 28, 2013, entitled SYSTEM AND METHOD FOR DRILLING HAMMER COMMUNICATION, FORMATION EVALUATION AND DRILLING OPTIMIZATION, now U.S. Pat. No. 8,517,093, issued Aug. 27, 2013, which claims benefit of U.S. Provisional Application No. 61/693,848, filed Aug. 28, 2012, entitled SYSTEM AND METHOD FOR DRILLING HAMMER COMMUNICATION AND FORMATION EVALUATION USING MAGNETORHEOLOGICAL FLUID VALVE ASSEMBLY, and to U.S. Provisional Application No. 61/644,701, filed May 9, 2012, entitled SYSTEM AND METHOD FOR DRILLING HAMMER COMMUNICATION AND FORMATION EVALUATION, all of which are incorporated by reference herein in their entirety.

TECHNICAL FIELD

The following disclosure relates to directional and conventional drilling.

BACKGROUND

Drilling a borehole for the extraction of minerals has become an increasingly complicated operation due to the increased depth and complexity of many boreholes, including the complexity added by directional drilling. Drilling is an expensive operation and errors in drilling add to the cost and, in some cases, drilling errors may permanently lower the output of a well for years into the future. Current technologies and methods do not adequately address the complicated nature of drilling. Accordingly, what is needed are a system and method to improve drilling operations.

BRIEF DESCRIPTION OF THE DRAWINGS

For a more complete understanding, reference is now made to the following description taken in conjunction with the accompanying Drawings in which:

FIG. 2A illustrates embodiments of a digital signal and a corresponding baseband signal;

FIG. 2B illustrates one embodiment of a spectrum of the baseband signal of FIG. 2A;

FIG. 8A illustrates embodiments of a digital waveform and a corresponding baseband waveform;

FIG. 8B illustrates one embodiment of a spectrum of the transmitted baseband waveform of FIG. 8A;

DETAILED DESCRIPTION

Figure 1A:
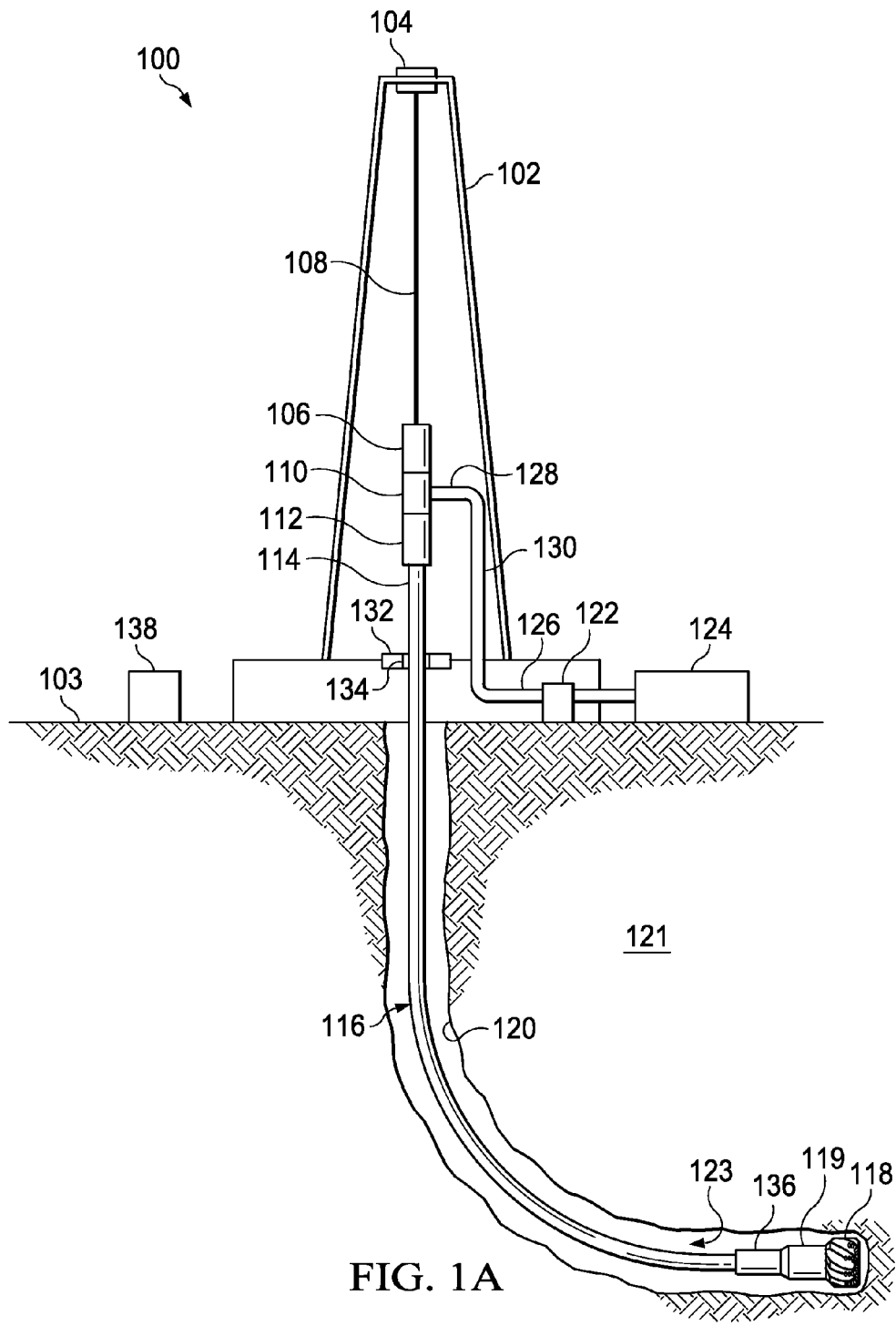
FIG. 1A illustrates an environment within which various aspects of the present disclosure may be implemented.

Referring now to the drawings, wherein like reference numbers are used herein to designate like elements throughout, the various views and embodiments of a system and method for spread spectrum based drill pipe communications are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

During the drilling of a borehole, it is generally desirable to receive data relating to the performance of the bit and other downhole components, as well as other measurements such as the orientation of the toolface. While such data may be obtained via downhole sensors, the data should be communicated to the surface at some point. However, data communication from downhole sensors to the surface tends to be excessively slow using current mud pulse and electromagnetic (EM) methods. For example, data rates may be in the single digit baud rates, which may mean that updates occur at a minimum interval (e.g., ten seconds). It is understood that various factors may affect the actual baud rate, such depth, flow rate, fluid density, and fluid type.

The relatively slow communication rate presents a challenge as advances in drilling technology increase the rate of penetration (ROP) that is possible. As drilling speed increases, more downhole sensor information is needed and needed more quickly in order to geosteer horizontal wells at higher speeds. For example, geologists may desire a minimum of one gamma reading per foot in complicated wells. If the drilling speed relative to the communication rate is such that there is only one reading every three to five feet, which may be fine for simple wells, the bit may have to be backed up and part of the borehole re-logged more slowly to get the desired one reading per foot. Accordingly, the drilling industry is facing the possibility of having to slow down drilling speeds in order to gain enough logging information to be able to make steering decisions.

This problem is further exacerbated by the desire for even more sensor information from downhole. As mud pulse and EM telemetry are serial channels, adding additional sensor information makes the communication problem worse. For example, if the current data rate enables a gamma reading to be sent to the surface every ten seconds via mud pulse, adding additional sensor information that must be sent along the same channel means that the ten second interval between gamma readings will increase unless the gamma reading data is prioritized. If the gamma reading data is prioritized, then other information will be further delayed. Another method for increased throughput is to use lower resolution data that, although the throughput is increased, provides less detailed data.

One possible approach uses wired pipe (e.g., pipe having conductive wiring and interconnects on either end), which may be problematic because each piece of the drill string has to be wired and has to function properly. For example, for a twenty thousand foot horizontal well, this means approximately six hundred connections have to be made and all have to function properly for downhole to surface communication to occur. While this approach provides a fast data transfer rate, it may be unreliable because of the requirement that each component work and a single break in the chain may render it useless. Furthermore, it may not be industry compatible with other downhole tools that may be available such as drilling jars, stabilizers, and other tools that may be connected in the drill string.

Another possible approach is to put more electronics (e.g., computers) downhole so that more decisions are made downhole. This minimizes the amount of data that needs to be transferred to the surface, and so addresses the problem from a data aspect rather than the actual transfer speed. However, this approach generally has to deal with high heat and vibration issues downhole that can destroy electronics and also puts more high cost electronics at risk, which increases cost if they are lost or damaged. Furthermore, if something goes wrong downhole, it can be difficult to determine what decisions were made, whether a particular decision was made correctly or incorrectly, and how to fix an incorrect decision.

Vibration based communications within a borehole typically rely on an oscillator that is configured to produce the vibrations and a transducer that is configured to detect the vibrations produced by the oscillator. However, the downhole power source for the oscillator is often limited and does not supply much power. Accordingly, the vibrations produced by the oscillator are fairly weak and lack the energy needed to travel very far up the drill string. Furthermore, drill strings typically have dampening built in at certain points inherently (e.g., the large amount of rubber contained in the power section stator) and the threaded connections may provide additional dampening, all of which further limit the distance the vibrations can travel.

Referring to FIG. 1A, one embodiment of an environment 100 is illustrated in which various configurations of vibration creation and/or control functionality may be used to provide frequency tuning, formation evaluation, improvements in rate of penetration (ROP), high speed data communication, friction reduction, and/or other benefits. Although the environment 100 is a drilling environment that is described with a top drive drilling system, it is understood that other embodiments may include other drilling systems, such as rotary table systems.

In the present example, the environment 100 includes a derrick 102 on a surface 103. The derrick 102 includes a crown block 104. A traveling block 106 is coupled to the crown block 104 via a drilling line 108. In a top drive system (as illustrated), a top drive 110 is coupled to the traveling block 106 and provides the rotational force needed for drilling. A saver sub 112 may sit between the top drive 110 and a drill pipe 114 that is part of a drill string 116. The top drive 110 rotates the drill string 116 via the saver sub 112, which in turn rotates a drill bit 118 of a bottom hole assembly (BHA) 119 in a borehole 120 in formation 121. A mud pump 122 may direct a fluid mixture (e.g., mud) 123 from a mud pit or other container 124 into the borehole 120. The mud 123 may flow from the mud pump 122 into a discharge line 126 that is coupled to a rotary hose 128 by a standpipe 130. The rotary hose 128 is coupled to the top drive 110, which includes a passage for the mud 123 to flow into the drill string 116 and the borehole 120. A rotary table 132 may be fitted with a master bushing 134 to hold the drill string 116 when the drill string is not rotating.

As described in detail in U.S. Pat. No. 8,517,093, which is incorporated herein by reference in its entirety, various embodiments of downhole tools 136 may be used to produce vibrations in a controlled manner to enable information to be transmitted along the drill string to the surface. The vibrations are generated by controlled impacts between two surfaces. Although shown as positioned behind the BHA 119, the downhole tool 136 may be part of the BHA 119, positioned elsewhere along the drill string 116, or distributed along the drill string 116 (including within the BHA 119 in some embodiments). Using the downhole tool 136, tunable frequency functionality may be provided that can used for communications as well as to detect various parameters such as rotations per minute (RPM), weight on bit (WOB), and formation characteristics of a formation in front of and/or surrounding the drill bit 118. By tuning the frequency, an ideal drilling frequency may be provided for faster drilling. The ideal frequency may be determined based on formation and drill bit combinations and the communication carrier frequency may be oscillated around the ideal frequency, and so may change as the ideal frequency changes based on the formation. Frequency tuning may occur in various ways, including physically configuring an impact mechanism to vary an impact pattern and/or by skipping impacts through dampening or other suppression mechanisms.

It is understood that the vibration generation and control functionality provided by the downhole tool 136 may be incorporated into a variety of standalone device configurations placed anywhere in the drill string 116. These devices may come in the form of agitator variations, drilling sensor subs, dedicated signal repeaters, and/or other vibration devices. In some embodiments, it may be desirable to have separation between the downhole tool 136 and the bottom hole assembly (BHA) for implementation reasons. In some embodiments, distributing the locations of such mechanisms along the drill string 116 may be used to relay data to the surface if transmission distance limits are reached due to increases in drill string length and hole depth. Accordingly, the location of the vibration creation device or devices does not have a required position within the drill string 116 and both single unit and multi-unit implementations may distribute placement of the vibration generating/encoding device throughout the drill string 116 based on the specific drilling operation being performed.

Vibration control and/or sensing functionality may be downhole and/or on the surface 103. For example, sensing functionality may be incorporated into the saver sub 112 and/or other components of the environment 100. In some embodiments, sensing and/or control functionality may be provided via a control system 138 on the surface 103. The control system 138 may be located at the derrick 102 or may be remote from the actual drilling location. For example, the control system 138 may be a system such as is disclosed in U.S. Pat. No. 8,210,283 entitled SYSTEM AND METHOD FOR SURFACE STEERABLE DRILLING, filed on Dec. 22, 2011, and issued on Jul. 3, 2012, which is hereby incorporated by reference in its entirety. Alternatively, the control system 138 may be a stand alone system or may be incorporated into other systems at the derrick 102. For example, the control system 138 may receive vibration information from the saver sub 112 via a wired and/or wireless connection (not shown). Some or all of the control system 138 may be positioned in the downhole tool 136, or may communicate with a separate controller in the downhole tool 136. The environment 100 may include sensors positioned on and/or around the derrick 102 for purposes such as detecting environmental noise that can then be canceled so that the environmental noise does not negatively affect the detection and decoding of downhole vibrations.

Figure 1B:
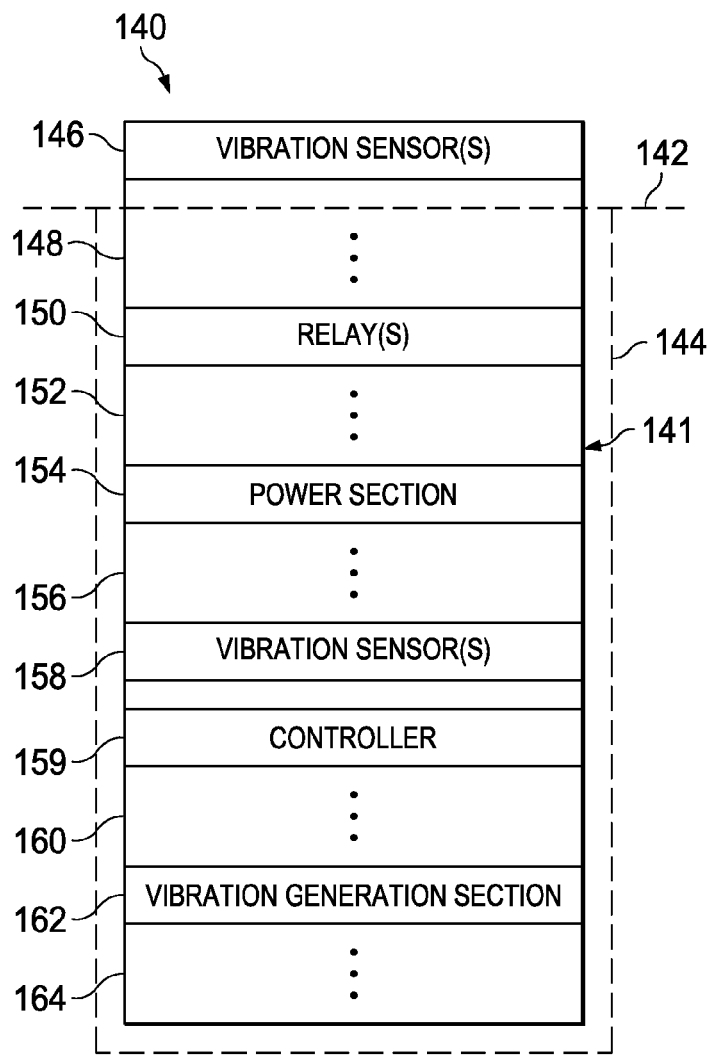
FIG. 1B illustrates one embodiment of a system that may be used to create vibrations within an environment such as the environment of FIG. 1A.

Referring to FIG. 1B, one embodiment of a system 140 is illustrated that may be used to create vibrations. The system 140 is illustrated relative to a surface 142 and a borehole 144. The system 140 includes a vibration generation section 162, a controller 159, one or more vibration sensors 158 (e.g., high sensitivity axial accelerometers) for decoding vibrations downhole, and a power section 154, all of which may be positioned within a drill string 141 that is within the borehole 144.

The controller 159, which may also handle information encoding, may be part of a control system (e.g., the control system 138 of FIG. 1A) or may communicate with such a control system. The controller 159 may synchronize dampening timing with impact timing. More specifically, because vibration measurements are being made locally, the controller 159 may rapidly adapt dampening to match changes in vibration frequency and/or amplitude using one or more of the dampening mechanisms described herein. For example, the controller 159 may synchronize the dampening with the occurrence of impacts so that, if the timing of the impacts changes due to changes in formation hardness or other factors, the timing of the dampening may change to track the impacts. This real time or near real time synchronization may ensure that dampening occurs at the peak amplitude of a given impact and not between impacts as might happen in an unsynchronized system. Similarly, if impact amplitude increases or decreases, the controller 159 may adjust the dampening to account for such amplitude changes.

The vibration sensors 158 may be placed within fifty feet or less (e.g., within five feet) of the vibration source provided by the vibration generation section 162. In the present embodiment, the vibration sensors 158 may be positioned between the power section 154 and the vibration source due to the dampening effect of the rubber that is commonly present in the power section stator. The positioning of the vibration sensors 158 relative to the vibration source may not be as important for communications as for formation sensing, because the vibration sensors 158 may need to be able to sense relatively slight variations in formation characteristics and being closer to the vibration source may increase the efficiency of such sensing. The more distance there is between the vibration source and the vibration sensors 158, the more likely it is that slight changes in the formation will not be detected. The vibration sensors 158 may include one sensor for measuring axial vibrations for WOB and another sensor for formation evaluation.

The system 140 may also include one or more vibration sensors 146 (e.g., high sensitivity axial accelerometers) positioned above the surface 142 for decoding transmissions and one or more relays 150 positioned in the borehole 144. The vibration sensors 146 may be provided in a variety of ways, such as being part of an intelligent saver sub that is attached to a top drive on the drill rig (not shown). The relays 150 may not be needed if the vibrations produced by the vibration generation section 162 are strong enough to be detected on the surface by the vibration sensors 146. The relays 150 may be provided in different ways and may be vibration devices or may use a mud pulse or EM tool. For example, agitators may be used in drill strings to avoid friction problems by using fluid flow to cause vibrations in order to avoid friction in the lateral portion of a drill string. The mechanical vibration mechanism provided by the vibration generation section 162 may provide such vibrations at the bit and/or throughout the drill string. This may provide a number of benefits, such as helping to hold the toolface more stably and maintain consistent WOB.

In some embodiments, a similar or identical mechanism may be applied to an agitator to provide relay functionality to the agitator. For example, the relay may receive a vibration having a particular frequency f, use the mechanical mechanism to generate an alternative frequency signal, and may transmit the original and alternative frequency signals up the drill string. By generating the additional frequency signal, the effect of a malfunctioning relay in the chain may be minimized or eliminated as the additional frequency signal may be strong enough to reach the next working relay.

It is understood that the sections forming the system 140 may be positioned differently. For example, the power section 154 may be positioned closer to the vibration generation section 162 than the vibration sensors 158, and/or one or more of the vibration sensors 158 may be placed ahead of the vibration generation section 162. In still other embodiments, some sections may be combined or further separated. For example, the vibration sensors 158 may be included in a mud motor assembly, or the vibration sensors 158 may be separated and distributed in different parts of the drill string 141. In still other embodiments, the controller 159 may be combined with the vibration sensors 158 or another section, may be behind one or more of the vibration sensors 158 (e.g., between the power section 154 and the vibration sensors 158), and/or may be distributed.

The remainder of the drill string 141 includes a forward section 164 that may contain the drill bit and additional sections 160, 156, 152, and 148. The additional sections 160, 156, 152, and 148 represent any sections that may be used with the system 140, and each additional section 160, 156, 152, and 148 may be removed entirely in some embodiments or may represent multiple sections. For example, one or both of the sections 148 and 152 may represent multiple sections and one or more relays 150 may be positioned between or within such sections.

In operation, the vibration generation section 162 creates vibrations. The vibration sensors 158, which may be powered by the power section 154, detect the vibrations for the controller 159. The controller 159 converts the information contained in the vibrations to digital signals and transmits the digital signals up the drill string using the vibration generation section 162. The vibrations sent up the drill string are detected by the vibration sensors 146 and decoded to recover the information.

Figure 1C:
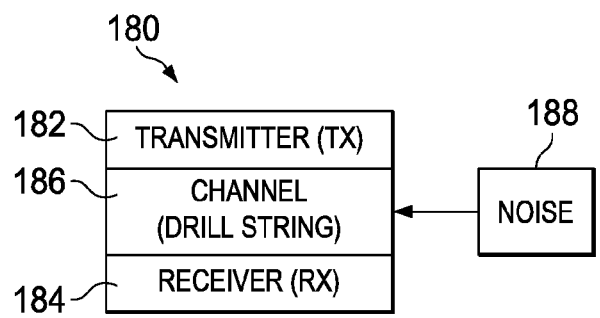
FIG. 1C illustrates one embodiment of the environment of FIG. 1A from a communications perspective.

Referring to FIG. 1C, an environment 180 illustrates one embodiment of the environment 100 of FIG. 1A from a communications perspective. The environment 180 includes a transmitter (TX) 182 that is coupled to a receiver (RX) 184 via a communication channel 186. In the present example, the communication channel 186 is the drill string 116 of FIG. 1A and information is transmitted via elastic waves that pass through the drill string. The elastic waves are generated using controlled impacts, such as are described above. One or more noise sources 188 (e.g., the drilling bit and other equipment, such as a top-drive) may inject noise into the communication channel 186 that affects the transmission of the information.

Referring to FIG. 2A, a graph 200 illustrates embodiments of a digital signal 202 and a corresponding baseband raw signal 204 plotted against a y-axis 206 representing amplitude and an x-axis 208 representing time in seconds. The amplitude is shown in terms of a bit stream forming the digital signal and so varies from "0" to "1." In some embodiments, the "0" may be viewed as no impact and the "1" may be viewed as full impact from the perspective of controlled impacts.

For purposes of example, the digital signal 202 represents information encoded as a bit stream of 11111000010011001010111100001 at a bit-rate of 100 Hz. This is the information that is to be transmitted to the surface by a transmitter, such as the transmitter 182 of FIG. 1C. The baseband signal 204 represents the transmitted form of the digital signal. This is the signal that is generated using controlled impacts, such as are described above. In the present example, the bit stream 11111000010011001010111100001 is represented by a sequence of delta pulses, which produce an ideal waveform version of the baseband signal 204.

Ideally, the baseband signal 204 would arrive unaltered at the surface to be decoded, but this does not occur due to factors such as attenuation and reflection. More specifically, various complications exist when attempting to send a signal containing the information along the drill string. For example, the impacts caused by the vibration generation section 162 (FIG. 1B) create elastic waves that are affected by such factors as attenuation and reflection of the signal at joints of the pipe. Attenuation occurs as the energy in the elastic waves dissipates over distance. Reflection occurs at the joints because the ends of each pipe have threaded joints and the joints have a different mass and cross-section than the pipes. The periodic spatial interval along the drilling string makes information transmission within some frequency bands possible. A higher sampling rate on the receiver side creates an environment in which the original signal spectrum is duplicated. This duplication occurs naturally due to oversampling theory. Rather than discarding or otherwise minimizing this duplicative effect, the present disclosure leverages the duplications on the receiver side to aid in reproducing the original signal.

Referring to FIG. 2B, a graph 210 illustrates one embodiment of the spectrum amplitude of the digital signal 202 as a curve 212 plotted against a y-axis 214 representing amplitude and an x-axis 216 representing the frequency in Hz.

Figure 2C:
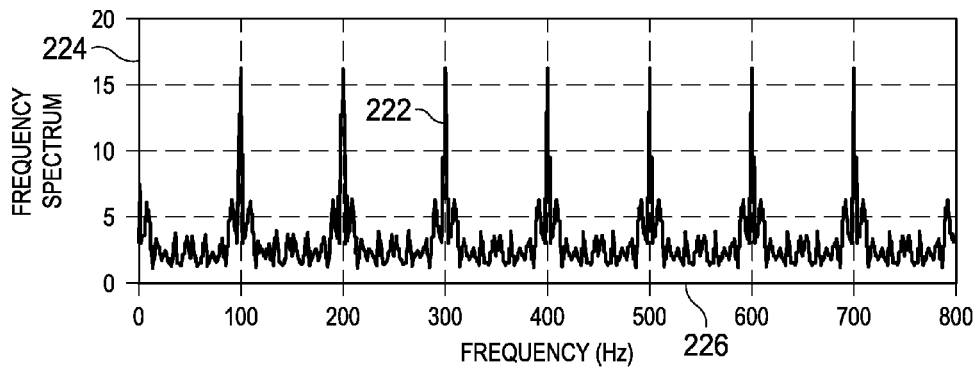
FIG. 2C illustrates one embodiment of the spectrum of FIG. 2B after duplication due to reflection within the drill string.

Referring to FIG. 2C, a graph 220 illustrates one embodiment of the spectrum amplitude of the baseband signal 204 as a curve 222 plotted against a y-axis 224 representing amplitude and an x-axis 226 representing the frequency in Hz. In the present example, the spectrum curve 212 of FIG. 2B is duplicated eight times in FIG. 2C. This is due to the receiver side having a sampling rate that is eight times faster than the transmitting bit-rate, i.e. 800 Hz. Because the signal is duplicated naturally, the faster sampling rate may capture some or all of the duplicated signal curves as illustrated in FIG. 2C.

As will be described in greater detail below, this duplication means that the some or all of the baseband information may be available in different frequency ranges. This knowledge may in turn be used to select one or more frequency bands that provide a higher quality signal (e.g., that have a better signal to noise ratio (SNR) than other passbands) because any desired frequency bands will likely contain at least a portion of the duplicated baseband signal. If no high quality frequency range is available with the width needed to capture the entire spectrum of the baseband signal, multiple bands can be combined to recover the baseband signal with certain fusion technology.

Figure 2D:
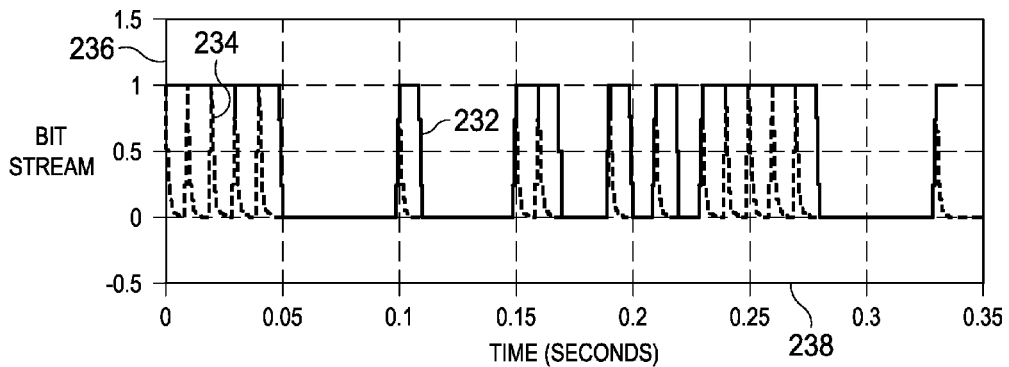
FIGS. 2D and 2E illustrate alternative embodiments of FIGS. 2A and 2C, respectively.

Referring to FIG. 2D, a graph 230 illustrates embodiments of a digital signal 232 and a baseband signal 234 plotted against a y-axis 236 representing amplitude and an x-axis 238 representing time. FIG. 2D illustrates a more realistic example of FIG. 2A in terms of the waveform shape of the baseband signal 234.

Figure 2E:
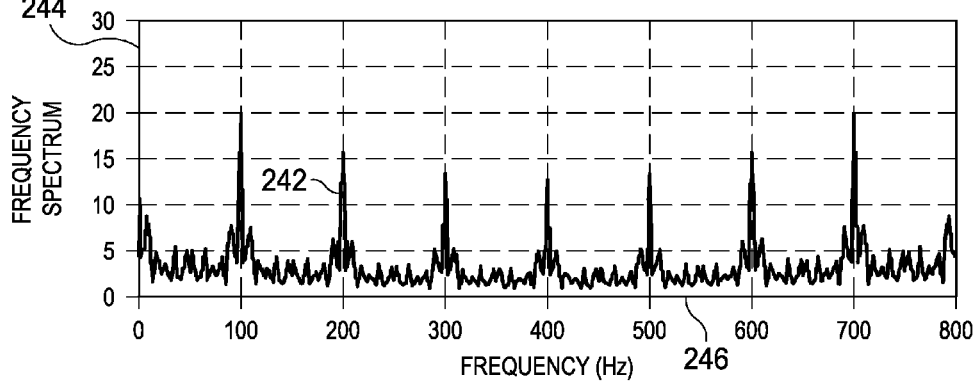

Referring to FIG. 2E, a graph 240 illustrates one embodiment of the spectrum of the baseband signal 234 as a curve 242 plotted against a y-axis 244 representing amplitude and an x-axis 246 representing the frequency in Hz. Compared to the ideal curve 222 of FIG. 2C, the curve 242 clearly illustrates energy decay (e.g., attenuation) along the frequency axis 246. This difference in the decay between FIGS. 2C and 2E occurs because a single pulse generated by the actual impact mechanism is much wider in width than the ideal delta pulse used in FIG. 2A to create the spectrum of FIG. 2C. It is noted that although attenuation has affected the amplitude at various frequencies, multiple duplications are still caught by a faster sampling rate of the receiver.

Figure 3:
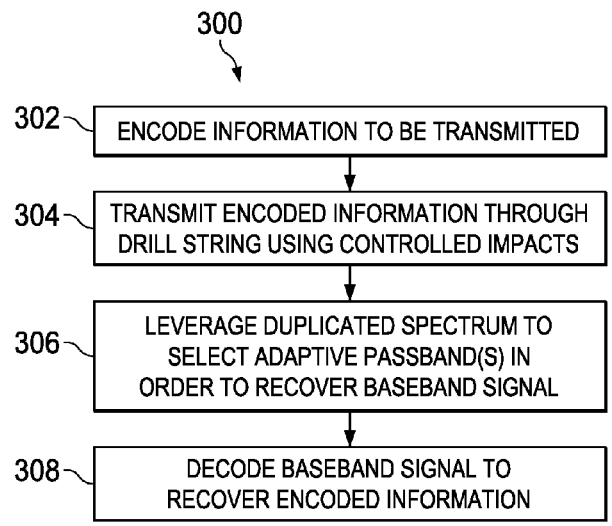
FIG. 3 illustrates a flow chart of one embodiment of a method that may be used within the environment of FIG. 1C for communications.

Referring to FIG. 3, a method 300 illustrates one embodiment of a process that may be used within the environment 180 of FIG. 1C. The method 300 leverages the existence of the duplicated spectrum, which may be accomplished in various ways. In any given transmission, a single comb filter passband that is part of the frequency characteristics 600 of the drilling pipe communication channel may contain all or part of the baseband spectrum and/or multiple passbands may contain duplicate information. This knowledge may be used to determine how the baseband information should be recovered. For example, a particular passband, such as 602, 604, 606, or 608 in FIG. 6A, may be selected for demodulation based on one or more desirable criteria exhibited by the passband. Alternatively, multiple passbands may be selected and combined to restore the baseband signal.

Accordingly, in step 302, the information to be transmitted is encoded by the transmitter 182. In step 304, the encoded information is transmitted as a baseband signal through the communication channel 186 (e.g., the drill string) using controlled impacts as described previously. In step 306, receiver 184 leverages the existence of the duplicate spectrum curves to select one or more adaptive passbands for use in recovering the baseband signal. More specifically, because the transmission is broadband, the receiver can sample at a higher rate than the transmission rate and capture the duplicated baseband spectrum. This enables the receiver to select one or more relatively high quality portions of the broadband signal and still obtain the entire spectrum needed to recover the baseband signal. Alternatively, the receiver can use the entire broadband signal. As will be described below, the passbands may be adapted to compensate for variations within the channel as the variations occur.

Figure 4:
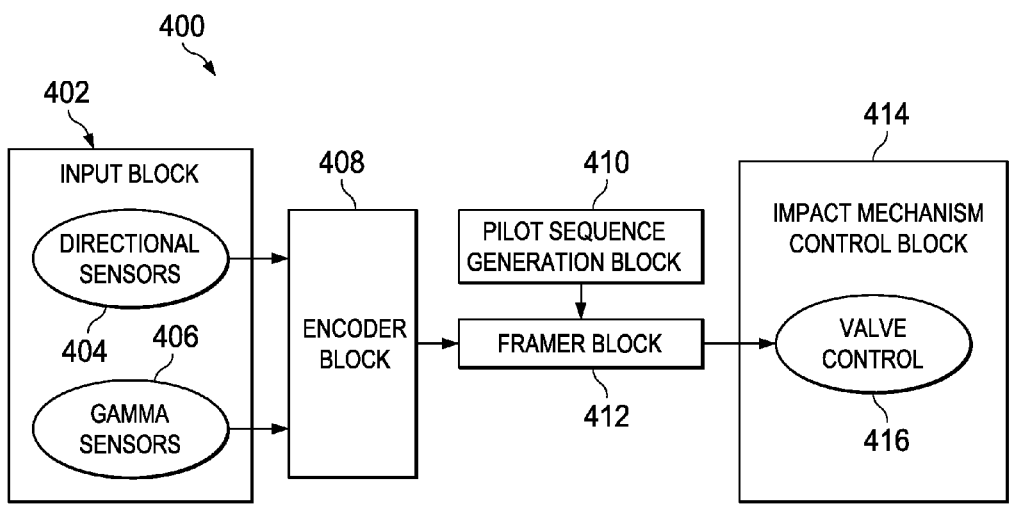
FIG. 4 illustrates one embodiment of a transmitter that may be used within the environment of FIG. 1C.

Referring to FIG. 4, a block diagram of one embodiment of a transmitter 400 is illustrated that may be used in an environment such as the environment 180 of FIG. 1C. In the present embodiment, the transmitter 400 includes an input block 402, an encoder block 408, a pilot sequence generation block 410, a framer block 412, and an impact mechanism control block 414. The transmitter 400 is positioned in the borehole and may be located in the downhole tool 136 (FIG. 1A) or elsewhere (e.g., in another component of the drill string 116). It is understood that one or more of the components illustrated in FIG. 4 may be located elsewhere (e.g., distributed). Furthermore, while the block diagram of FIG. 4 illustrates basic functionality that may be used to receive, encode, and transmit information, it is understood that one or more of the components may not be considered part of the transmitter 400 in some embodiments.

The input block 402 may include one or more sensors, such as directional sensors 404 and/or gamma sensors 406, as illustrated in FIG. 4. The sensors may be positioned anywhere along the drill string as long as they can relay their information to the transmitter 400. In other embodiments, the input block 402 may not contain sensors, but may receive information from such sensors and/or may receive sensor information from another source. For example, the input block 402 may be configured to receive one or more digital and/or analog streams of information.

The encoder block 408 translates the information from the input block 402 into a bit stream that is to be transmitted. The encoder block 408 may perform various functions, although it is understood that such functions may vary depending on the particular implementation of the encoder block 408. For example, the encoder block 408 may be configured to avoid long consecutive identical digits (CIDs). As is known, strings of CIDs may create problems in communications systems. By avoiding CIDs, the encoder block 408 can make the timing recovery on the receiver side more robust and simple. As another example, the encoder block 408 may add error detection capabilities with additional parity bits to improve the bit-error rate (BER). In yet another example, the encoder block 408 may shape the spectrum of the baseband signal to make the signal more tolerant to channel variations and additive noise over the channel. Examples of the coding approach used by the encoder block 408 may include, but are not limited to, 6b8b or 8b10.

The pilot sequence generation block 410 is used to periodically inject a pilot sequence (which may also be referred to as a training sequence) into the communication channel (e.g., the drill string). The pilot sequence is sent periodically by the transmitter 400 to help the receiver evaluate the current channel conditions. This will be discussed in greater detail below with respect to the receiver.

The frame block 412 provides defined transmission units and may be used to aid in synchronizing the transmitter 400 with the receiver.

The impact mechanism control block 414 performs the actual transmission process by controlling the impacts created by the vibration generation section 162 (FIG. 1B) to generate the baseband signal. For example, the impact mechanism control block 414 may allow an impact to occur to transmit a "1" and may prevent or otherwise minimize an impact to transmit a "0." It is understood that the impact mechanism control block 414 may not actually control the actuation of the impact mechanism in some embodiments, but may pass information to another controller that performs the actuation functions. In the present example, the impact mechanism control block 414 includes a valve control 416.

Figure 5:
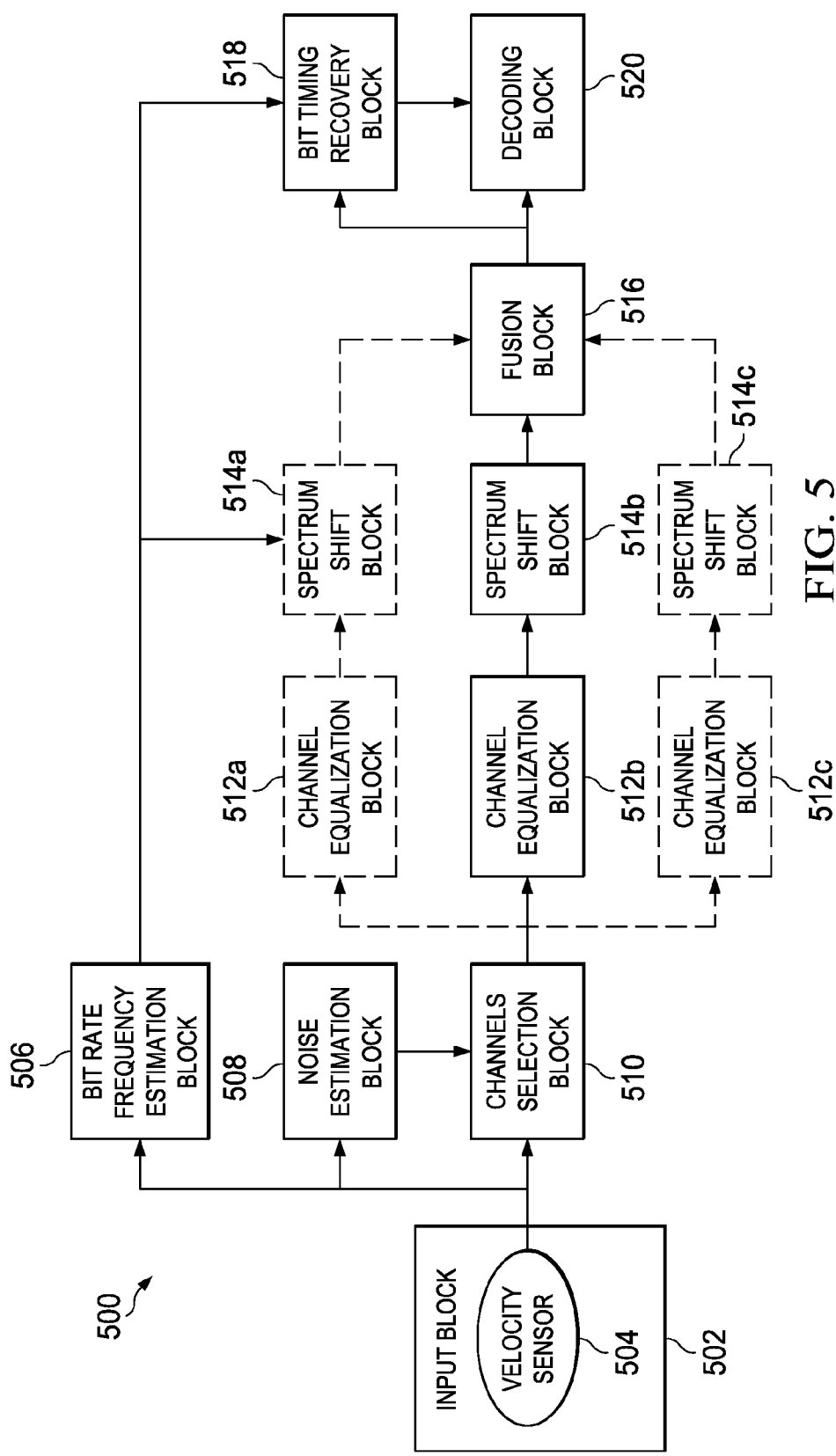
FIG. 5 illustrates one embodiment of a receiver that may be used within the environment of FIG. 1C.

Referring to FIG. 5, a block diagram of one embodiment of a receiver 500 is illustrated. In the present embodiment, the receiver 500 includes an input block 502, a bit rate frequency estimator block 506, a noise estimator block 508, a channel selection block 510, fractionally spaced baseband or band-pass channel equalization blocks 512a-512c, spectrum shift blocks 514a-514c, a fusion block 516, a bit timing recovery block 518, and a decoding block 520. The receiver 500 is positioned on the surface (e.g., out of the borehole) or between the surface and the transmitter 400 (FIG. 4). It is understood that one or more of the components illustrated in FIG. 5 may be located elsewhere (e.g., distributed). Furthermore, while the block diagram of FIG. 5 illustrates basic functionality that may be used to receive and decode information, it is understood that one or more of the components may not be considered part of the receiver 500 in some embodiments.

The input block 502 may include one or more sensors, such as velocity sensor 504, as illustrated in FIG. 5. The sensor 504 may be positioned anywhere along the drill string or on the surface as long as it can relay its information to the receiver 500. In other embodiments, the input block 502 may not contain sensors, but may receive information from such sensors and/or may receive sensor information from another source. For example, the input block 502 may be configured to receive one or more digital and/or analog streams of information.

The bit rate frequency estimator block 506 is used to handle possible frequency varying and phase jitter. More specifically, although the baseband bit-rate is known to the receiver 500, a small amount of instantaneous frequency varying leading to phase shift might still exist. The bit rate frequency estimator block 506 uses the known bit-rate as an approximate frequency reference, a narrow-band filter is turned to 1/T to extract the bit-rate frequency, and then phase aligns to the transitions in the demodulated signal. A digital phase-locked loop (PLL) may be used to produce sampling instants from the demodulated signal that contains interference and additive noise.

The noise estimator block 508 is used to minimize the impact of background noise in the received signal. More specifically, acoustic noise negatively affects the baseband signal. For example, noise from sources such as the drilling bit and the top-drive on the rig are believed to be two major acoustic noise sources. This noise propagates through the drill string and is directly added to the baseband signal, which degrades the quality of the received signal. To counter this signal degradation, the acoustic noise is measured during periods when there is no information being transmitted. Because the measured acoustic noise is unlikely to be in the form of a white distribution (e.g., evenly distributed across a given spectrum) in spite of overall noise power, the power spectral density (PSD) may also be estimated at a selected frequency resolution. The noise PSD helps to evaluate the received signal quality within certain objective frequency bands.

The channel selection block 510 is used to select one or more passbands for demodulation. Inputs to the channel selection block 510 include the input block 502 and the noise estimator block 508. As described previously, reflections within the drill string create different wave reflections between the pipes and joints result in a comb-filter effect on the propagation of the acoustic wave in the drill string and provide one or more identifiable channels that may be selected as desired frequency bands.

Figure 6A:
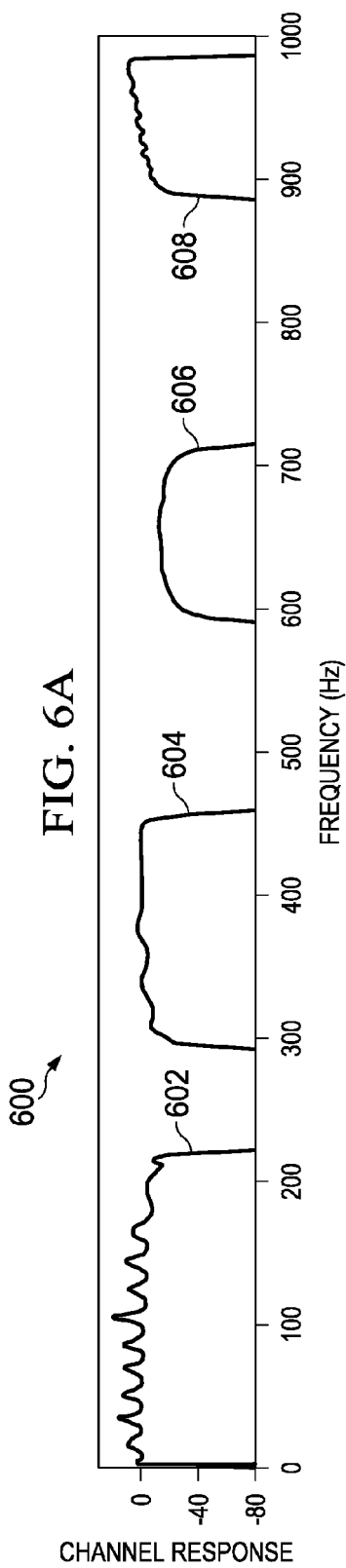
FIG. 6A illustrates one embodiment of a channel response showing interleaved pass-bands and stop-bands.
Figure 6B:
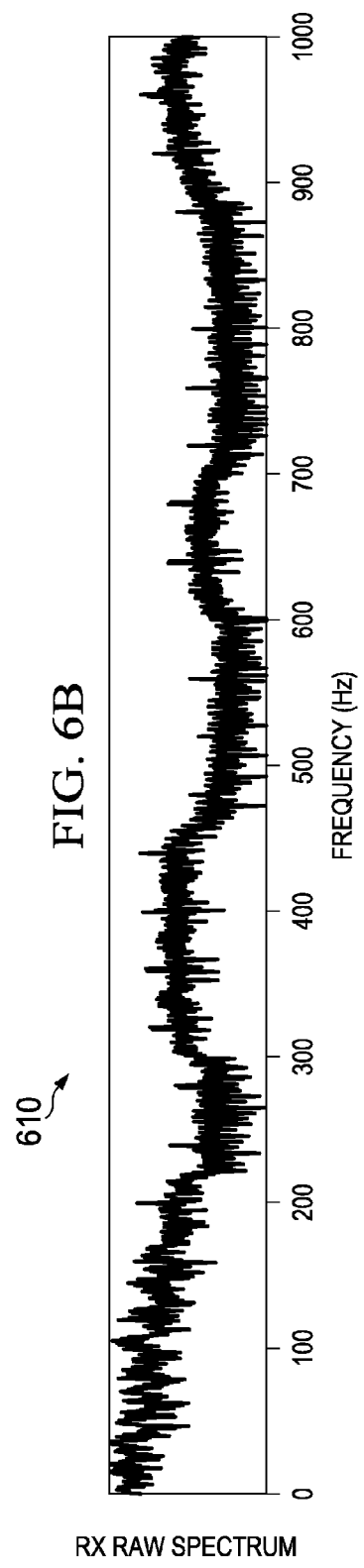
FIG. 6B illustrates one embodiment of a received raw frequency spectrum corresponding to the channel response of FIG. 6A.

With additional reference to FIGS. 6A and 6B, this comb-filter effect results in pass-bands and stop-bands that are interleaved across the spectrum of the received signal. FIG. 6A illustrates a graph 600 showing the channel unit impulse response in amplitude. The received raw frequency spectrum is illustrated by the graph 610 of FIG. 6B. In the present example, there are four pass-bands 602, 604, 606, and 608 evident under the 1 kHz frequency point. Due to the duplication characteristic of the oversampled received signal, the same baseband information may be contained in multiple passbands and/or one passband may contain part of the baseband spectrum. Accordingly, two different approaches may be used in channel selection.

One approach involves selecting a single passband as the candidate for demodulation based on the associated SNR that is calculated using the noise level estimated during idle period. For example, the passband containing the most desirable SNR may be selected as long as it is wide enough to contain the needed signal information. The other approach involves selecting multiple passbands and using the information in those passbands to restore the baseband information using a fusion process. It is understood that the second approach may still use SNR as one criterion for selecting a particular passband for the fusion process.

The fractionally spaced channel equalization blocks 512a-512c are used to adapt to fluctuations that may occur within a passband. More specifically, within each passband, the power attenuation and phase shift have a certain degree of fluctuation. In the time domain, such fluctuation is demonstrated as inter-symbol interference (ISI) that is related at least partially to the structure of the drill string. The channel equalization blocks 512a-512c may also address other factors that may induce destructive interference to the power and/or phase of the received signal at each passband. The channel equalization blocks 512a-512c may be used to implement an equalization scheme that is designed to adapt to such channel variations and to eliminate or at least reduce unwanted effects.

More specifically, as described previously, a pilot training sequence is sent periodically by the transmitter 400 to help the receiver 500 evaluate the real time channel situation. The pilot training sequence can be pseudo-random binary signals generated by a linear feedback shift register. The generation scheme of the pilot sequence is known to the receiver 500, so that the receiver can generate the exact same bit sequence. The channel equalization can be achieved by methods such as, but not limited to, a least mean square estimation algorithm, a recursive least square algorithm, and/or similar methods. The results of equalization produces an adaptive filter for a particular passband. For example, the coefficients of the adaptive filter can be adjusted to minimize the mean square error between the filter output and the known pilot sequence to optimize the passband. The filter coefficients are updated at least as fast as the bit-rate. The equalizer can be realized either at baseband or bandpass. When the training sequence is finished, the equalizer switches to decision directed mode (i.e., using the binary decision output as the desired signal for further fine adaptation). Such a channel estimation procedure can be performed in either the time domain or the frequency domain. Any possible channel slow variations may be tracked by such an adaptive procedure to account for changes as they occur over time.

An adaptive equalizer with the inverse of the channel response can then be applied to the received information stream (e.g., other than the pilot signal). Accordingly, by optimizing each passband using information gained from the pilot signal, the receiver 500 is able to compensate for gain and phase distortions at selected passbands. Ideally, the output of the adaptive filter will be the input to the communication channel.

If a single passband is selected, only a single channel equalization block (e.g., the block 512b) may be used. If more than one passband is selected, the equalization procedure can be performed separately for each passband in parallel using the parallel blocks illustrated in FIG. 5.

The spectrum shift blocks 514a-514c are used to relocate a desired spectrum band to DC. It is shifted by a corresponding center frequency that is multiple of 1/T, which is the output of the bit rate frequency estimator block 506, to place the selected band at DC. In some embodiments, a low-pass filter with the cut-off frequency set at 1/(2T) may be applied to remove other unwanted high frequency components.

The fusion block 516 is used to combine multiple passbands (if selected). More specifically, a fusion process is applied to combine filtered passbands. The fusion process can use, but is not limited to, a maximum ratio combination (MRC) algorithm that applies different gains to each passband and then sums the passbands together. The fusion gains can be obtained using the SNR of each passband so that passbands with higher quality received signals contribute more to the final fusion output than passbands with lower quality signals.

The bit timing recovery block 518 provides a timing synchronization scheme. It is used to provide a correct timing to sample the equalizer 514b output or fusion block output 516. Using the output from PLL inside bit-rate estimation block 506 as a reference and benefitting from the encoder inside the transmitter 400, the peak of each base band signal pulse can be sampled at the precise time instants.

The decoding block 520 corresponds to the encoder block 408 on the transmitter side and performs decoding to translate the bit stream back to the information bit stream.

Figure 7:
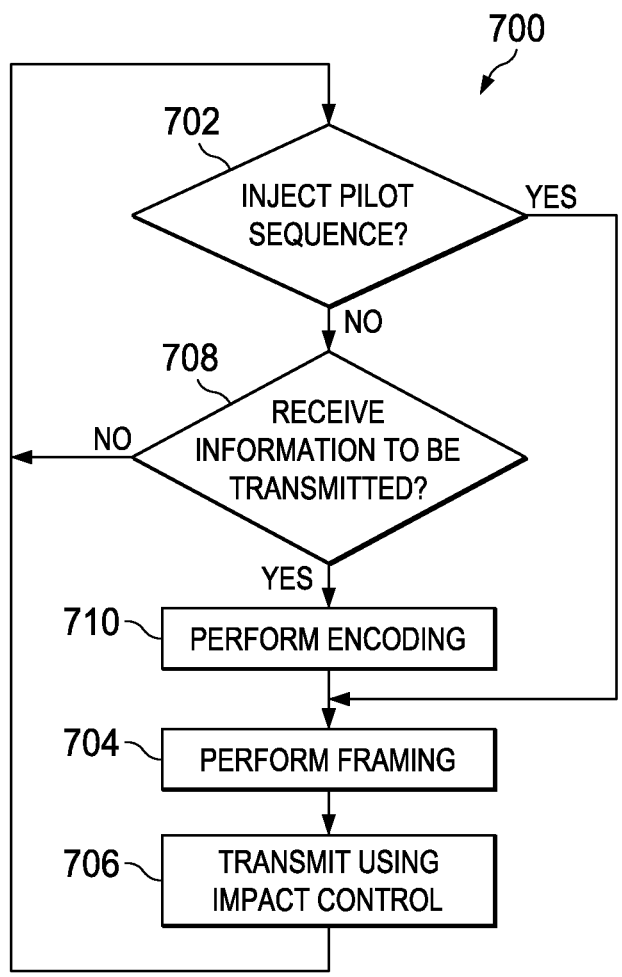
FIG. 7 illustrates a flow chart of one embodiment of a method that may be used with a transmitter such as the transmitter of FIG. 4.

Referring to FIG. 7 and with additional reference to FIGS. 8A and 8B, a method 700 illustrates one embodiment of a process that may be used with the transmitter 400 of FIG. 4. FIGS. 8A and 8B illustrate graphs of embodiments of waveforms that correspond to particular steps of the method 700.

In step 702, a determination may be made as to whether a pilot signal should be transmitted. For example, the determination may include such factors as how long it has been since the pilot signal was last transmitted and/or whether there is currently other information to be transmitted. The pilot signal may generally be transmitted only when other information is not being transmitted. In some embodiments, the transmission of other information may be interrupted for the pilot signal, particularly if a defined period of time has elapsed.

If the determination of step 702 indicates that the pilot signal is to be transmitted, the method 700 continues to step 704. In step 704, the pilot signal is framed. In step 706, the pilot signal is transmitted via impact control as previously described. It is understood that, in some embodiments, the transmitter 400 may not perform the impact control process, but may instead send the framed pilot signal to another system that controls the actual impact process. The method 700 then returns to step 702.

If the determination of step 702 indicates that no pilot signal is to be transmitted, the method 700 continues to step 708. In step 708, a determination may be made as to whether there is information (e.g., other than the pilot signal) to be transmitted. If the determination of step 708 indicates that there is no information to be transmitted, the method 700 returns to step 702.

If the determination of step 708 indicates that there is information to be transmitted, the method 700 moves to step 710. In step 710, the information is encoded. The method 700 then continues through steps 704 and 706 to transmit the encoded information. This is shown in graph 800 of FIG. 8A with embodiments of an encoded digital waveform 802 that is to be transmitted and the corresponding baseband waveform 804 that is actually transmitted. FIG. 8B illustrates a graph 810 that shows an embodiment of the spectrum amplitude 812 of the transmitted baseband waveform 804.

Figure 9:
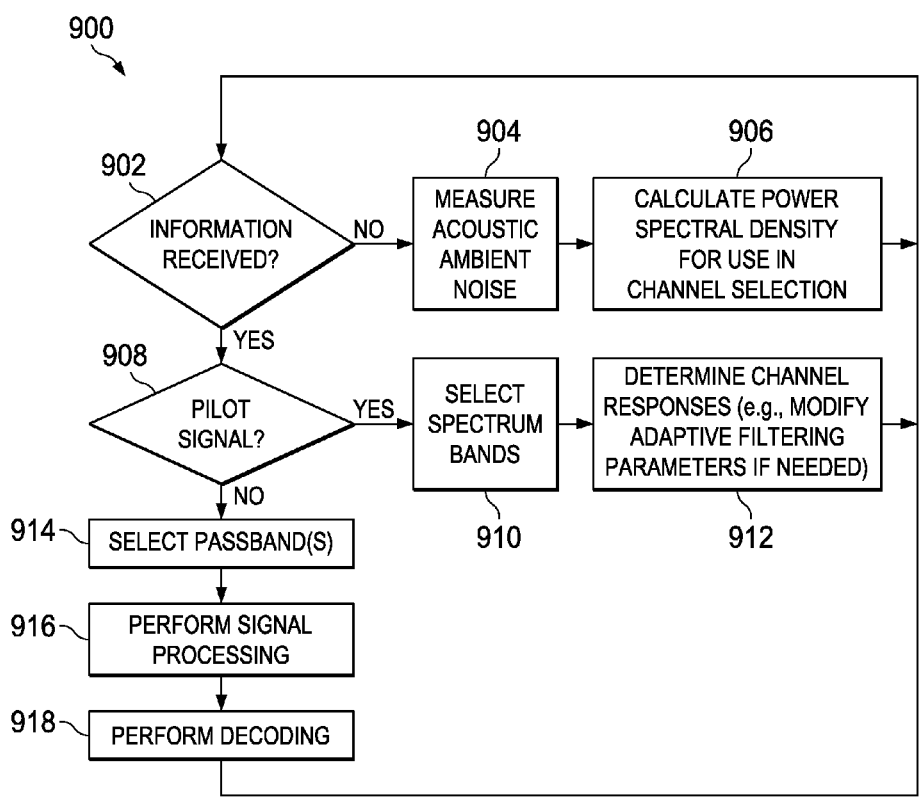
FIG. 9 illustrates a flow chart of one embodiment of a method that may be used with a receiver such as the receiver of FIG. 5.
Figure 10A:
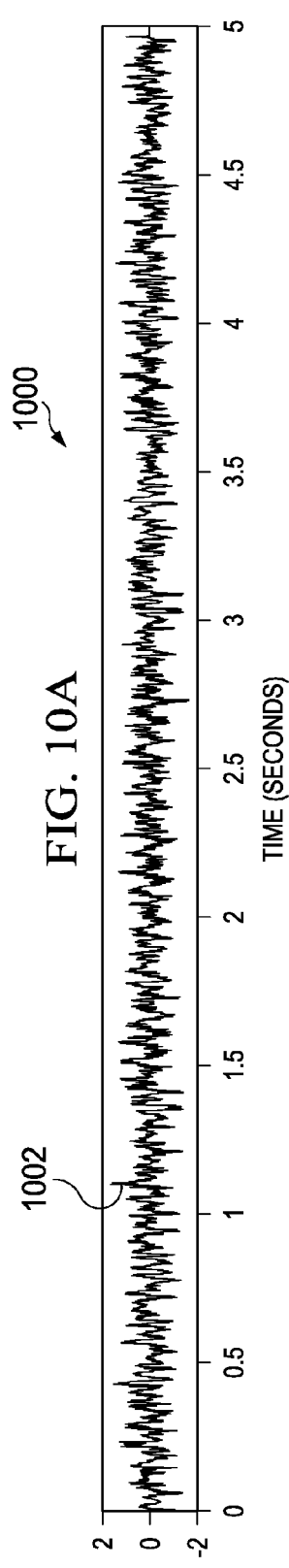
FIG. 10A illustrates one embodiment of a raw received waveform of the baseband waveform of FIG. 8A.
Figure 10B:
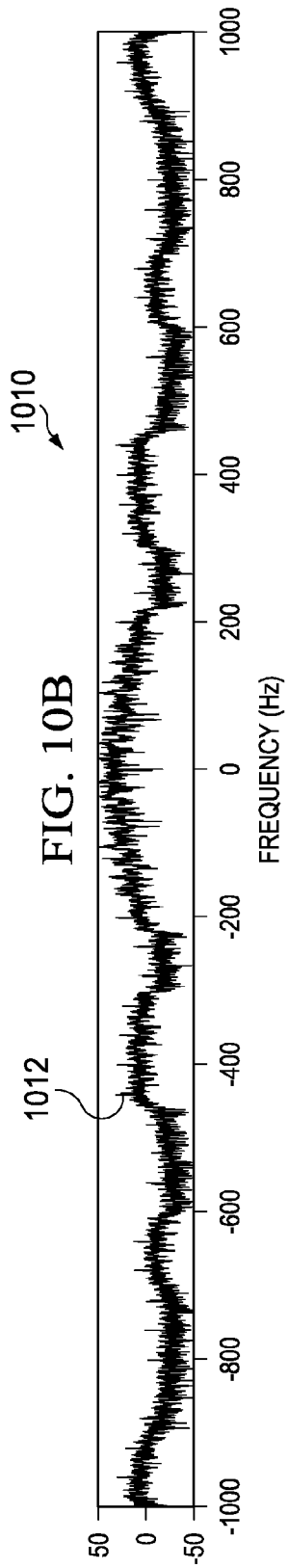
FIG. 10B illustrates one embodiment of a spectrum of the received baseband waveform of FIG. 10A.

Referring to FIG. 9 and with additional reference to FIGS. 10A and 10B, a method 900 illustrates one embodiment of a process that may be used with the receiver 500 of FIG. 5. FIGS. 10A and 10B illustrate graphs of embodiments of waveforms that correspond to particular steps of the method 900.

In step 902, a determination is made as to whether information has been received via the drill string. If the determination of step 902 indicates that no information has been received, the method 900 moves to step 904. In step 904, the acoustic noise may be measured across the frequency range of interest. In step 906, the power spectral density may be calculated based on the measured acoustic noise. The PSD may be used later during channel selection. The method 900 then returns to step 902. It is understood that a timer or other trigger may be checked before steps 904 and 906 are performed to prevent the method from constantly looping through steps 904 and 906 whenever no information has been received.

If the determination of step 902 indicates that information has been received, the method 900 moves to step 908. In step 908, a determination is made as to whether the information is a pilot signal. The determination of the pilot signal can be performed by calculating the cross-correlation function. If the determination of step 908 indicates that the information is a pilot signal, the method 900 moves to step 910.

In step 910, one or more spectrum bands are selected based on criteria such as signal to noise ratio. The noise power of the interested spectrum band is obtained from step 904. With the desired spectrum bands selected, the method 900 moves to step 912.

In step 912, the method 900 uses the pilot signal to determine the channel responses for one or more channels. The channel responses are taken into account by, for example, modifying adaptive filtering coefficients if needed. The method 900 then returns to step 902.

If the determination of step 902 indicates that information has been received and the determination of step 908 indicates that the information is not a pilot signal, the method 900 moves to step 914. Graph 1000 of FIG. 10A illustrates an embodiment of the raw waveform 1002 of the received signal and graph 1010 of FIG. 10B illustrates an embodiment of the raw spectrum amplitude 1012 of the received signal, which varies from the spectrum amplitude 812 of the transmitted signal of FIG. 8B due to the non-ideal channel conditions.

In step 914, one or more spectrum bands are selected based on the decision made by step 909 to use in recovering the baseband signal. For purposes of example, this desired frequency band is located around 400 Hz (e.g., four times of the transmission bit rate) in the spectrum amplitude 1012 of FIG. 10B. In step 916, signal processing (e.g., decision directed equalization, spectrum shifting, and/or filtering) is performed to recover the baseband signal. One embodiment of step 916 is described in greater detail below with respect to FIG. 11. In step 918, the baseband signal is decoded to recover the information bit stream that it contains. The method 900 then returns to step 902.

Figure 11:
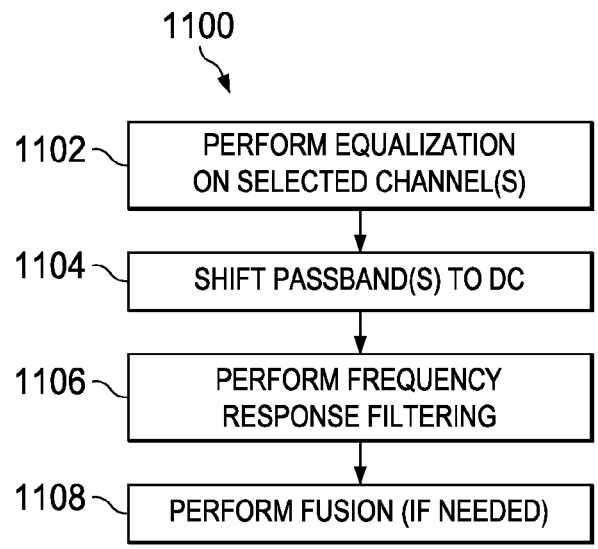
FIG. 11 illustrates a flow chart of a more detailed embodiment of a processing step of the method of FIG. 9.
Figure 12A:
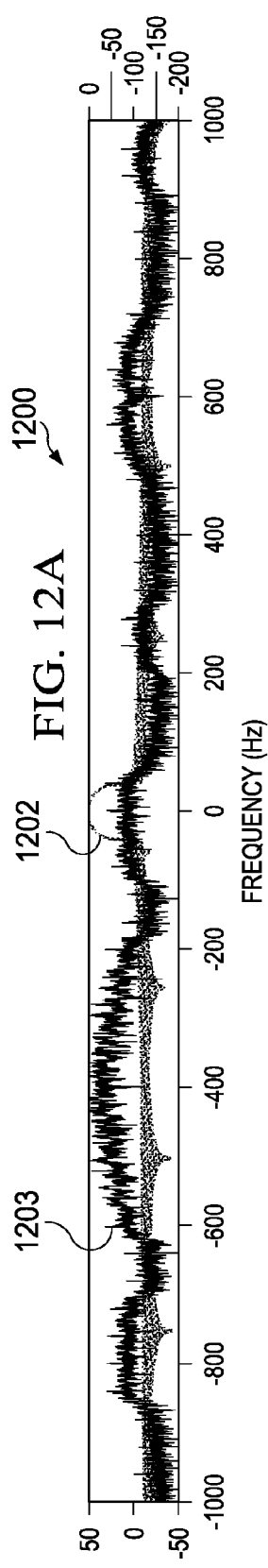
FIG. 12A illustrates one embodiment of the spectrum of FIG. 10B after being shifted by 400 Hz and also illustrates a filter positioned with respect to the shifted spectrum.
Figure 12B:
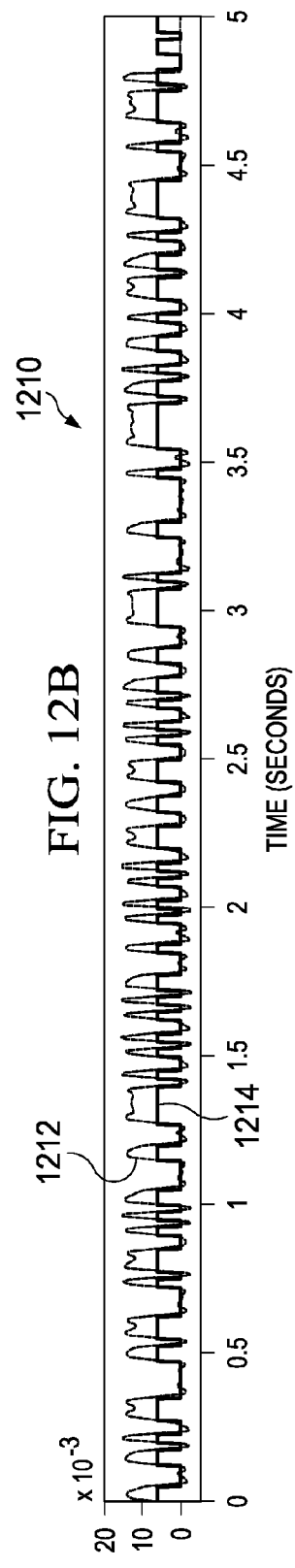
FIG. 12B illustrates one embodiment of the baseband waveform after the filter of FIG. 12A is applied and a digital waveform that corresponds to the baseband waveform.

Referring to FIG. 11 and with additional reference to FIGS. 12A and 12B, a method 1100 illustrates one embodiment of a process that may be used for step 916 of FIG. 9. FIGS. 12A and 12B illustrate graphs of embodiments of waveforms that correspond to particular steps of the method 1100.

In step 1102, a baseband or passband linear equalization process is performed by the channel equalization blocks 512a-512c as described with respect to FIG. 5. In step 1104, the spectrum 1012 of FIG. 10B may be shifted to center the selected band on DC, as shown in graph 1200 of FIG. 12A. The spectrum amplitude 1203 is the shifted version of the equalized signal. In step 1106, frequency response filtering may be performed to isolate the passband as shown in FIG. 12A with filter frequency response 1202. The filtering results in a time domain waveform 1212 of the baseband signal as shown in graph 1210 of FIG. 12B. The time domain waveform 1212 can be converted to its digital equivalent waveform 1214.

Figure 13:
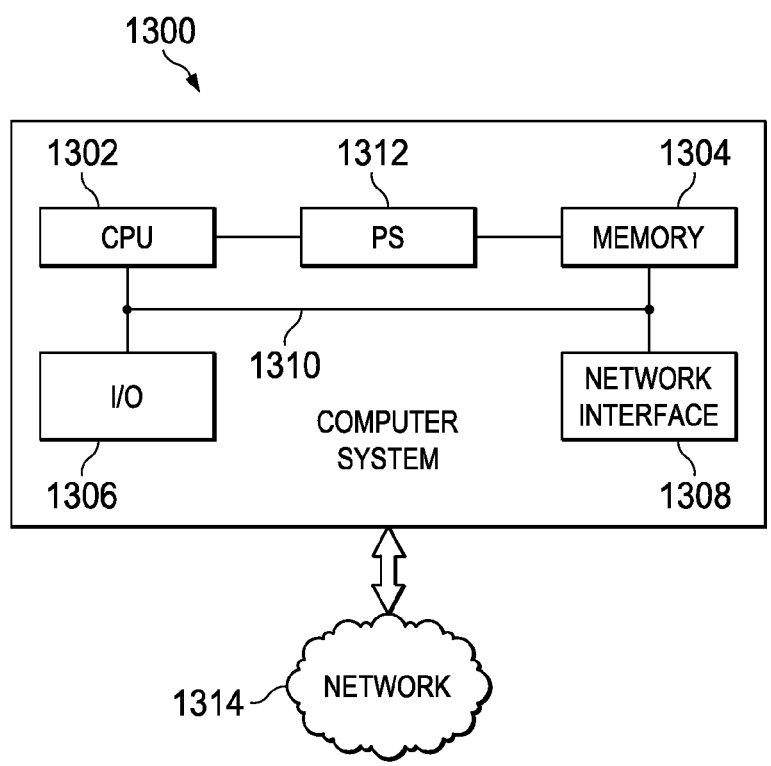
FIG. 13 illustrates one embodiment of a computer system that may be used within the environment of FIG. 1A.

Referring to FIG. 13, one embodiment of a computer system 1300 is illustrated. The computer system 1300 is one possible example of a system component or device such as the control system 138 of FIG. 1A. In scenarios where the computer system 1300 is on-site, such as within the environment 100 of FIG. 1A, the computer system may be contained in a relatively rugged, shock-resistant case that is hardened for industrial applications and harsh environments. It is understood that downhole electronics may be mounted in an adaptive suspension system that uses active dampening as described in various embodiments herein.

The computer system 1300 may include a central processing unit ("CPU") 1302, a memory unit 1304, an input/output ("I/O") device 1306, and a network interface 1308. The components 1302, 1304, 1306, and 1308 are interconnected by a transport system (e.g., a bus) 1310. A power supply (PS) 1312 may provide power to components of the computer system 1300, such as the CPU 1302 and memory unit 1304. It is understood that the computer system 1300 may be differently configured and that each of the listed components may actually represent several different components. For example, the CPU 1302 may actually represent a multi-processor or a distributed processing system; the memory unit 1304 may include different levels of cache memory, main memory, hard disks, and remote storage locations; the I/O device 1306 may include monitors, keyboards, and the like; and the network interface 1308 may include one or more network cards providing one or more wired and/or wireless connections to a network 1314. Therefore, a wide range of flexibility is anticipated in the configuration of the computer system 1300.

The computer system 1300 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, and servers depending on the use of the computer system 1300. The operating system, as well as other instructions (e.g., software instructions for performing the functionality described in previous embodiments) may be stored in the memory unit 1304 and executed by the processor 1302. For example, if the computer system 1300 is the control system 138, the memory unit 1304 may include instructions for performing the various methods and control functions disclosed herein.

It will be appreciated by those skilled in the art having the benefit of this disclosure that this system and method for causing, tuning, and/or otherwise controlling vibrations provides advantages in downhole environments. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for use with a drill string positioned within a borehole, the method comprising:
    receiving, by a receiver, a baseband signal transmitted via vibrations through the drill string using a plurality of elastic waves;
    oversampling the received baseband signal at the receiver to duplicate a spectrum of the baseband signal a plurality of times,
    determining whether a single passband of a plurality of available passbands has a predetermined signal to noise ratio and sufficient bandwidth to include an entire spectrum of the baseband signal of one of the plurality of spectrums of the baseband signal created by the oversampling;
    selecting, by the receiver, if the single passband is available, the single passband from the plurality of passbands that are caused by the reflection of the baseband signal within the drill string based on one of the plurality of passbands having the predetermined signal to noise ratio and sufficient bandwidth to include the entire spectrum of the baseband signal of one of the plurality of spectrums of the baseband signal created by the oversampling, in order to recover the baseband signal from the duplicated spectrum;
    selecting, by the receiver if the single passband is not available, multiple passbands from the plurality of passbands including different portions of the spectrum of the baseband signal;
    combining portions of the spectrum of the baseband signal recovered from each of the selected multiple passbands to recover the entire spectrum of the baseband signal, the combination based upon a signal to noise ratio of each of the passbands, such that higher quality passbands contribute more to the combination than the passbands with lower quality signals; and
    decoding, by the receiver, the baseband signal to recover a bit stream contained within the baseband signal.

2. The method of claim 1 further comprising:
    measuring acoustic noise when no signal is being received;
    estimating a noise power spectral density using the measured acoustic noise; and
    using the noise power spectral density to find the signal to noise ratio.

3. The method of claim 1 wherein the multiple passbands contain overlapping portions of the baseband signal due to the duplicated spectrum.

4. The method of claim 1 wherein each of the multiple passbands is selected based on at least one of a signal to noise ratio of the passband or a width of the passband.

5. The method of claim 1 further comprising calculating a weight for each of the multiple passbands based on a signal to noise ratio of the passband for which the weight is being determined, wherein the weight calculated for each passband determines how that passband is used when combining portions of the baseband signal.

6. The method of claim 1 further comprising identifying the plurality of available passbands.

7. The method of claim 1 further comprising:
    receiving a pilot training signal from a transmitter that is responsible for generating the baseband signal within the drill string;
    determining a channel response within the at least one passband based on the pilot signal; and
    equalizing a waveform obtained via the at least one passband using the channel response.

8. The method of claim 7 wherein multiple passbands are selected from the plurality of available passbands, and wherein the steps of determining a channel response and equalizing the passband are performed for each of the multiple passbands.

9. The method of claim 1 further comprising sampling the baseband signal at a rate that is a multiple of a rate at which the baseband signal was transmitted.

10. A method for use with a drill string positioned within a borehole, the method comprising:
    receiving, by a receiver, a pilot signal transmitted through the drill string via vibrations using a first plurality of elastic waves;
    modifying, by the receiver, an adaptive filter corresponding to at least one passband to compensate for variances between the received pilot signal and a known pilot signal;
    receiving, by the receiver, a baseband signal transmitted through the drill string using a second plurality of elastic waves;
    equalizing, by the receiver, the baseband signal using the adaptive filter to form a corrected baseband signal;
    oversampling the received baseband signal at the receiver to duplicate a spectrum of the baseband signal a plurality of times,
    determining whether a single one of a plurality of available passbands has a predetermined signal to noise ratio and sufficient bandwidth to include an entire spectrum of the baseband of the plurality of spectrums of the baseband signal created by the oversampling signal;
    selecting, by the receiver, when the single passband is available, the single passband from the plurality of passbands that are caused by the reflection of the baseband signal within the drill string based on one of the plurality of passbands having the predetermined signal to noise ratio and sufficient bandwidth to include the entire spectrum of the baseband signal of the plurality of spectrums of the baseband signal created by the oversampling, in order to recover the baseband signal from the duplicated spectrum;

selecting, by the receiver if the single passband is not available, multiple passbands from the plurality of passbands;

combining portions of the spectrum of the baseband signal recovered from each of the multiple passbands to recover the entire spectrum of the baseband signal, the combination based upon a signal to noise ratio of each of the passbands, such that higher quality passbands contribute more to the combination than the passbands with lower quality signals; and decoding, by the receiver, the baseband signal to recover a bit stream contained within the baseband signal.

11. The method of claim 10 wherein modifying the adaptive filter includes adjusting coefficients of the adaptive filter to minimize a mean square error between the received pilot signal and the known pilot signal.

12. A receiver for use in borehole communications comprising:

an input block configured to receive a plurality of duplicates of at least a portion of a spectrum of a baseband signal, the baseband signal includes a bit stream transmitted through a drill string positioned in a borehole via vibrations, the plurality of duplicates, caused by oversampling of the received baseband signal;

a channel selector configured to determine whether a single one of plurality of passbands has a predetermined signal to noise ratio and sufficient bandwidth to include the entire baseband signal of the plurality of spectrums of the baseband signal created by the oversampling, to select, if a single passband is available, the single passband from the plurality of passbands for use in recovering the baseband signal based on one of the plurality of passbands have the predetermined signal to noise ratio and the sufficient bandwidth to include the entire spectrum of the baseband signal of the plurality of spectrums of the baseband signal created by the oversampling, wherein the channel selector is configured to use the existence of the duplicates to select multiple passbands including different portions of the spectrum of the baseband signal from the plurality of available passbands if the single passband is not available to contain the entire spectrum of the baseband signal of the plurality of spectrums of the baseband signal created by the oversampling;

a fusion circuit for combining portions of the spectrum of the baseband signal recovered from each of the selected multiple passbands to recover the entire spectrum of the baseband signal, the combination based upon a signal to noise ratio of each of the passbands, such that higher quality passbands contribute more to the combination than the passbands with lower quality signals; and a decoder configured to recover the bit stream from the baseband signal.

13. The receiver of claim 12 further comprising a channel equalizer configured to compensate for variances in the at least one passband based on differences between a known pilot signal and a received pilot signal.

14. The receiver of claim 12 further comprising a bit timing recovery block configured to provide frequency jitter correction information to the decoder.

15. The receiver of claim 12 further comprising an acoustic noise block configured to provide acoustic noise information to the channel selector for signal to noise ratio calculations.

* * * * *